United States Patent [19]

Weinberg et al.

[11] 3,716,835

[45] Feb. 13, 1973

[54] PERSONAL STOCK QUOTATION SYSTEM

[75] Inventors: Harold Weinberg, Villanova; Marvin E. Rogers, Feasterville; Michael G. Dadario, Philadelphia; James A. Benson, Huntingdon Valley, all of Pa.

[73] Assignee: Sonex, Inc., Philadelphia, Pa.

[22] Filed: March 19, 1971

[21] Appl. No.: 126,224

[52] U.S. Cl................................340/154, 179/2 DP
[51] Int. Cl..........................H04m 11/00, H04q 9/00
[58] Field of Search ............340/152, 154; 179/2 DP

[56] References Cited

UNITED STATES PATENTS

| | | | |
|---|---|---|---|
| 3,249,919 | 5/1966 | Scantlin | 340/152 R |
| 3,500,327 | 3/1970 | Belcher et al. | 340/154 |
| 3,505,474 | 4/1970 | Quatse | 179/20 DP |
| 3,381,276 | 4/1968 | James | 179/2 DP |
| 3,516,062 | 6/1970 | Spraker | 179/2 DP |
| 3,594,583 | 7/1971 | Wolf | 179/84 VF |

Primary Examiner—Donald J. Yusko
Attorney—Caesar, Rivise, Bernstein & Cohen

[57] ABSTRACT

A personal stock quotation system having a data processing system with a memory having stored therein stock market information relating to a plurality of corporations is provided. The data processing terminal is connected to telephone terminal lines. A stock quotation terminal is provided which has a cradle for a telephone handset. The quotation terminal further includes a coupling means adjacent the cradle, signalling means for generating address and control signals for obtaining the stock information and display means for displaying the stock information obtained from the data processing system. Further features of the stock quotation terminal are touch keys which are utilized for signalling different combinations representative of corporations about which stock information is required.

8 Claims, 9 Drawing Figures

PATENTED FEB 13 1973

INVENTORS
HAROLD WEINBERG
MARVIN E. ROGERS
MICHAEL G. DADARIO
BY JAMES A. BENSON

Caesar, Rivise,
Bernstein & Cohen
ATTORNEYS

PERSONAL STOCK QUOTATION SYSTEM

This invention relates generally to stock quotation systems and more particularly to a personal stock quotation system.

Until recently, stock quotation systems were limited to direct display of the teletype information provided by the various stock exchanges. Where there was a pronounced interest in one stock or another, the stock brokerage houses typically had displays which listed the latest quotations as well as other information about the stock which had developed during the day. However, where a customer was interested in a particular stock, he would be able to get information about the same only if his stockbroker had noticed the last quotation provided on the teletype and had remembered the particular quote.

Recently, however, stock brokerage houses have been brought into the twentieth century by various data processing developments which have enabled stockbrokers to have, at their command, quotation terminals by which stock prices could be obtained by merely pressing several keys on the quotation terminals and various information about a stock could be obtained, such as the last price and the high, low and net change of the stock.

As a result of the stock brokerage houses obtaining these quotation terminals, persons interested in buying and selling stocks need only call up their stockbroker and instant information will be provided to them about the stock. However, the great bulk of persons who have holdings in the stock market do not have the need to call up their stockbrokers every day. But, since the average persons does have holdings in the stock market and is interested in knowing the recent prices of his stock holdings and those stocks in which he is interested, the only way in which he can do so at present is to call his stockbroker. There is, however, a hesitancy to call one's stockbroker where no purchase or sale is imminent since the stockbroker is normally a very busy man and most of his customers respect his time. The customer must therefore be willing to go down to a stock brokerage house if he is interested in finding out the latest prices.

Various stock brokerage houses in order to free their personnel for sale and purchasing have provided a quotation terminal in a place with access to the public so that the customers of the stock brokerage house can obtain the latest prices of their stocks.

Most people who have holdings in the stock market are, however, too busy to visit their stock brokerage house during the day and are also too busy to call up their stockbroker every time they wish to know certain stock prices. The price of the quotation terminals that are presently used by stock brokerage houses, however, are prohibitive for anyone other than an extremely wealthy person or a stockbroker whose volume warrants such a quotation terminal. Among the reasons for the high cost of the quotation terminals presently in use is the fact that wires must be installed which connect the quotation terminal to a central processing unit which has stored therein all of the stock prices. Thus, the quotation terminal cannot be used any place other than in a location which has been wired directly to a central processing unit.

It is, therefore, an object of the present invention to overcome the aforementioned disadvantages.

Another object of the invention is to provide a new and improved personal stock quotation system that can be installed in most places at negligible cost.

Another object of the invention is to provide a new and improved personal stock quotation system which utilizes a quotation terminal which is connected to a central processing unit via existing telephone lines.

Yet another object of the invention is to provide a new and improved personal stock quotation system which is simple to use yet which has access to not only last, bid and ask prices but also high, low and other pertinent information concerning a particular stock.

Still another object of the invention is to provide a new and improved personal stock quotation system which utilizes a terminal having a display to verify the stock selected on the keyboard of the quotation terminal.

These and other objects of the invention are achieved by providing a personal stock quotation system which utilizes data processing system with a memory having stored therein the stock market information related to a plurality of corporations. The data processing terminal is connected to telephone terminal lines so that a stock quotation terminal can be provided having a cradle for a telephone handset for connection to the data processing system. The quotation terminal includes coupling means which are adjacent the cradle such as an acoustic coupler and signalling means comprised of a touch keyboard which generates address and control signals for obtaining the stock information from the data processing unit. The terminal further includes display means for displaying the stock information obtained from the data processing system. The display means is also used prior to the obtaining of the stock market information for verifying the address placed into the stock market quotation terminal.

Figure 1:
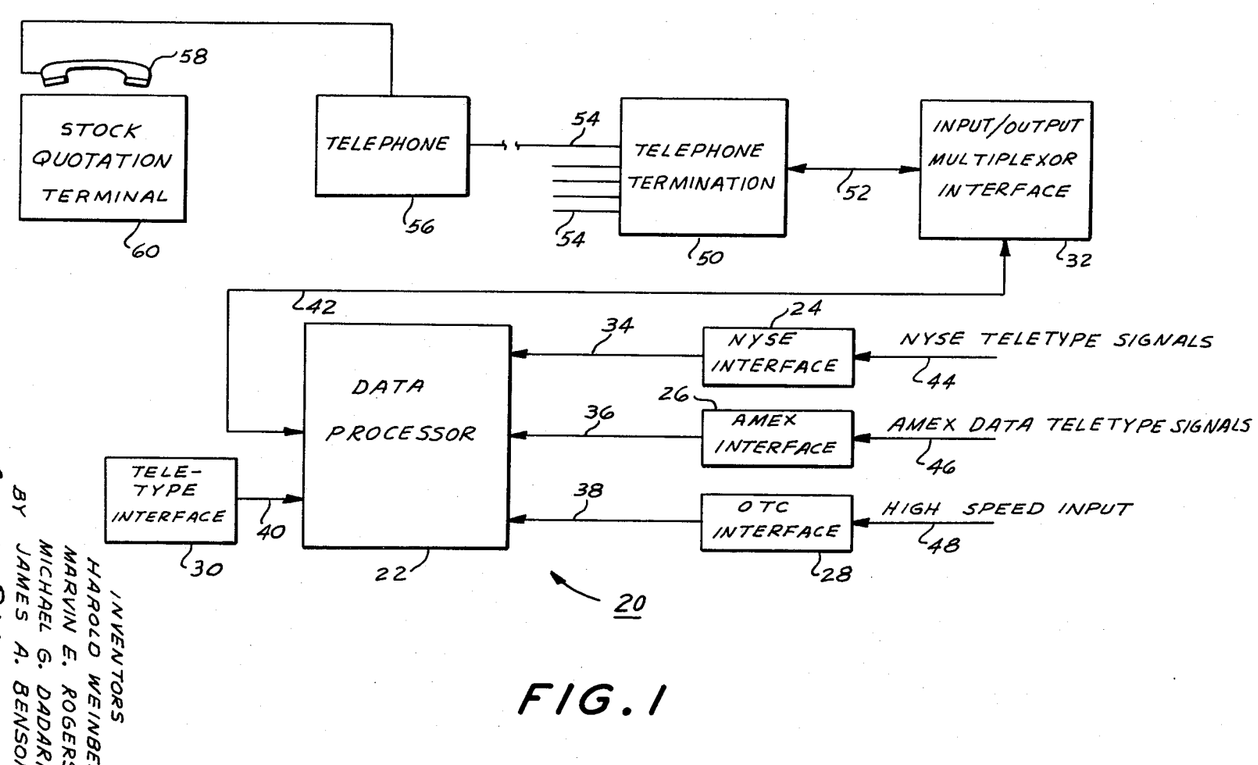
FIG. 1 is a schematic block diagram of a personal stock quotation system embodying the invention.

Other objects and many of the attendant advantages of this invention will be readily appreciated as the same becomes better understood by reference to the following detailed description when considered in connection with the accompanying drawings wherein:

FIG. 3, comprised of FIGS. 3A and 3B, is a schematic block diagram of the circuitry in the stock quotation terminal;

Referring now in greater detail to the various figures of the drawing wherein like reference numerals refer to like parts, a personal stock quotation system embodying the invention is shown generally at 20 in FIG. 1.

The personal stock quotation system includes a data processor 22 which has connected thereto a plurality of interfaces 24, 26, 28, 30 and 32. Interfaces 24 through 32 are connected to the data processor via lines 34, 36, 38, 40 and 42, respectively. Interface 24 is provided to insert New York Stock Exchange teletype signals provided on line 44 to the data processor. Interface 26 provides American Exchange stock quotations (AMEX) from a teletype line 46 to the data processor 22. The interface 28 provides over-the-counter information from a high speed line 48 to the data processor. Interface 30 provides manually inserted teletype information into the data processor 22. The teletype interface 30 enables the programs in the data processor to be changed and also enables correction of incorrect data which has been entered into the data processor by the various interfaces.

Interface 32 is an input-output multiplexor which is connected to the data processor 22 via lines 42 and to telephone termination equipment 50 via lines 52. The telephone termination equipment is standard telephone equipment which is connected to a plurality of telephone lines 54. The information in the data processor 22 can be accessed by conventional telephones 56 by dialing the number of the telephone termination 50. As long as any line of the lines 54 to telephone termination 50 are not being used, the telephone termination accepts the connection from telephone 56. The telephone 56 has its handset 58 placed in the cradle of the stock quotation terminal 60 which is then used to access the data processor 22 in order to obtain information concerning New York Stock Exchange, American Stock Exchange or over-the-counter stock quotations which have been stored into the data processor 22 via the interfaces 24 through 30.

A plurality of the stock quotation terminals 60, one for each telephone line 54 provided, are usable simultaneously in combination with conventional telephones 56 to obtain access to the data processor 22. The telephone termination 50 and the multiplexor interface 32 enable a plurality of the lines 54 to access the data processor 22. Data processor 22 is a conventional time sharing computer which enables access to a plurality of inputs. The data processor 22 maintains the address of the particular stock quotation terminal 60 which is making an inquiry to the data processor by assigning to each of the telephone lines connected to the telephone termination 50 a particular time slot in the time division multiplexing input.

Figure 2:
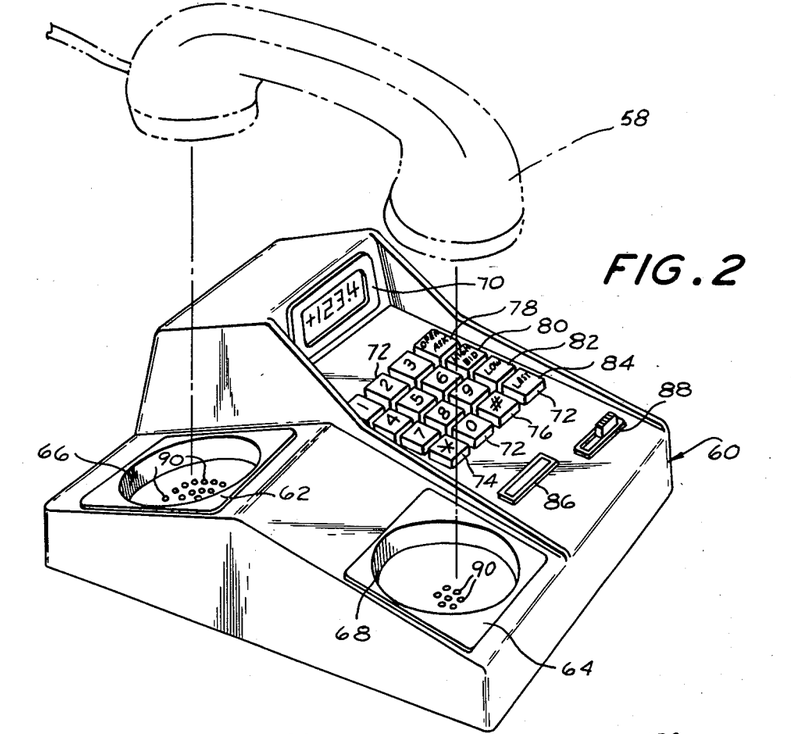
FIG. 2 is a perspective view of a stock quotation terminal utilized in the system.

The stock quotation terminal 60 is best seen in FIG. 2. As best seen therein, the stock quotation terminal includes a cradle comprised of a pair of sound attenuating cups 62 and 64 which have therein cylindrical recessess 66 and 68, respectively, for the reception of the transmitter and receiver portions of a telephone handset. A telephone handset 58 is shown in phantom in FIG. 2 to show the manner in which the handset is placed in the cradle of the terminal 60.

The quotation terminal 60 includes a display 70 which is comprised of a plurality of numerical seven segment display tubes, a display tube for indicating a "+" or a "−", and a pair of point displays between the second and third and the third and fourth numerical character tubes, respectively, for displaying a decimal point in order to provide fractions with the quotations. That is, as shown in FIG. 2, the number 123.4 represents a quotation of 123 4/8. The numeral following the decimal point is representative of the number of eighths of a point.

Below the display 70, a plurality of buttons or keys 72 is provided which comprise the keyboard. Sixteen buttons arranged in four rows of four buttons each are provided. As best seen in FIG. 2, a button is provided for each of the decimal digits 1 through 0. The buttons are arranged similarly to the buttons on the "touch-tone" telephone keyboards.

The keyboard further includes a button 74 having an asterisk (*) which is used to clear the display 70. Another button 76 is provided having a numerical sign ( # ) which is used to execute instructions and transfer instructions to the data processing system. In the right column of buttons 72, are provided four buttons which are specifically provided for the purpose of asking particular information about a stock. The first of these buttons 78 is used for asking the opening price of a New York Stock Exchange or American Stock Exchange stock and the ask price of an over-the-counter stock. The second button 80 is used to determine the high quotation for the day for a New York Stock Exchange or American Stock Exchange stock and the bid price of an over-the-counter stock. A third button 82 is used for determining the low price of a New York Stock Exchange or American Stock Exchange stock and a fourth button 84 is used for determining the last price of a New York Stock Exchange or American Stock Exchange stock. For an over-the-counter stock, the last price is the bid price. Provided adjacent the keyboard is an indicator lamp 86 which is illuminated when contact has been made by telephone to the data processor. An on-off switch 88 is also provided on the keyboard for connecting and disconnecting power to the terminal 60. A conventional electrical cord (not shown) is used for connecting the terminal to a standard 110–120 volt, 60 cycle per second power supply.

In operation, a telephone used in conjunction with the stock quotation terminal 60 is dialed. The number called is the telephone number at which the data processor 22 is located. If the data processor has been reached, a high pitched hum can be heard in the earpiece of the handset 58. The handset 58 is then placed in the cradle with the earpiece in recess 68 and the mouthpiece in recess 66 of the cuts 64 and 62, respectively. It should be noted that both cups 62 and 64 have openings 90 to enable sound communication between the terminal and the telephone handset.

As soon as the telephone handset has been placed in the cradle, the high pitched hum is picked up by the coupling device provided in the terminal which in turn causes indicator 86 to be illuminated and, thus, contact with the data processor is thereby affirmed.

A booklet is provided with the stock quotation terminal 60 having a list of the code numbers of the various stocks. When the particular code is determined, the clear button 74 is pressed which enables the terminal 60 to receive the numerical code for the stock. The numerical code is then pressed on the various buttons. For example, if the code for a stock is 234, then the 2 button is pressed followed by the 3 button and the 4 button. As each number button is pressed, the number on the button is presented to the display 70. Thus, if the number 234 appears in the window of the display 70, the operator of the terminal can verify the fact that the proper number has been placed in the data processing system. That is, the numerical display 70 is not controlled directly by the keyboard but rather by information received from the data processor via the telephone lines. Accordingly, the proper number appearing in the display window means that the number was properly transmitted to the data processing system and that the data processing system has without error provided the same code number back to the terminal 60.

After the code number has been visually verified, the operator then presses button 76 which causes the transmission of the code number into the address of the data processor. The data processor is then ready to provide specific data desired for the particular stock. In other words, the operator may now press any of the buttons 78 through 84 which provide the open, high, low and last prices, respectively, for New York Stock Exchange and American Stock Exchange stocks and the ask, bid, low bid and last bid prices for over-the-counter stocks. After each of the buttons has been pressed, the transmit button 76 is pressed in order to carry out the request. The data processor then provides the particular information to the display 70 of the stock quotation terminal 60.

After the data has been received on the display concerning the stock, if the operator desires to have information concerning another stock, the clear button 74 is pressed and the new numerical code is placed into stock quotation terminal 60 by pressing the appropriate button 72. As long as the numerical codes and other instructions are placed into the stock quotation terminal 60, the data processing system is connected to the stock quotation terminal 60. If, however, a hiatus of 30 to 35 seconds occurs without any new code or information requests concerning the code being placed into the stock quotation terminal 60, there is an automatic cut-off and the line at the data processing terminal is freed. The indicating lamp 86 loses the illumination and accordingly the terminal 60 is disconnected from the data processing system. In order to re-establish the contact with the data processing system, it is then necessary to have the telephone dialed to the appropriate number of the data processing system.

Figure 3A:
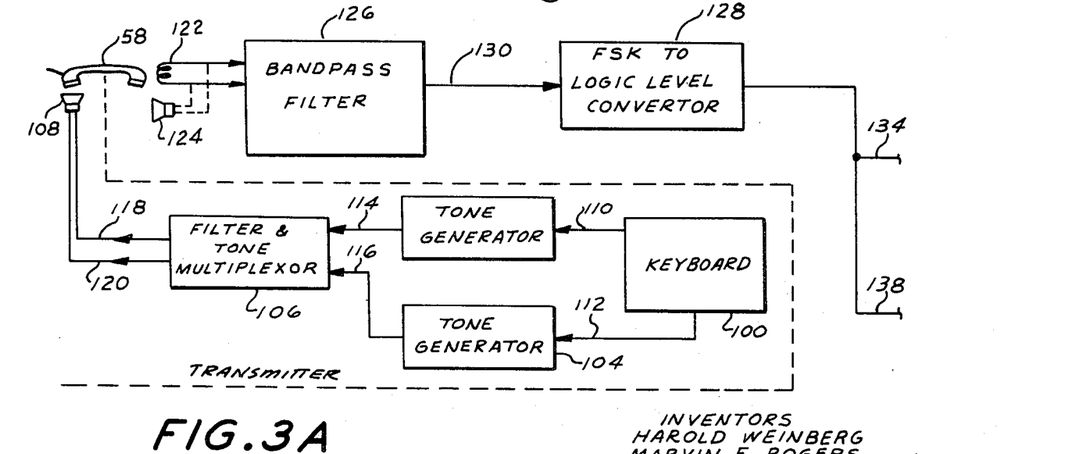
Figure 3B:
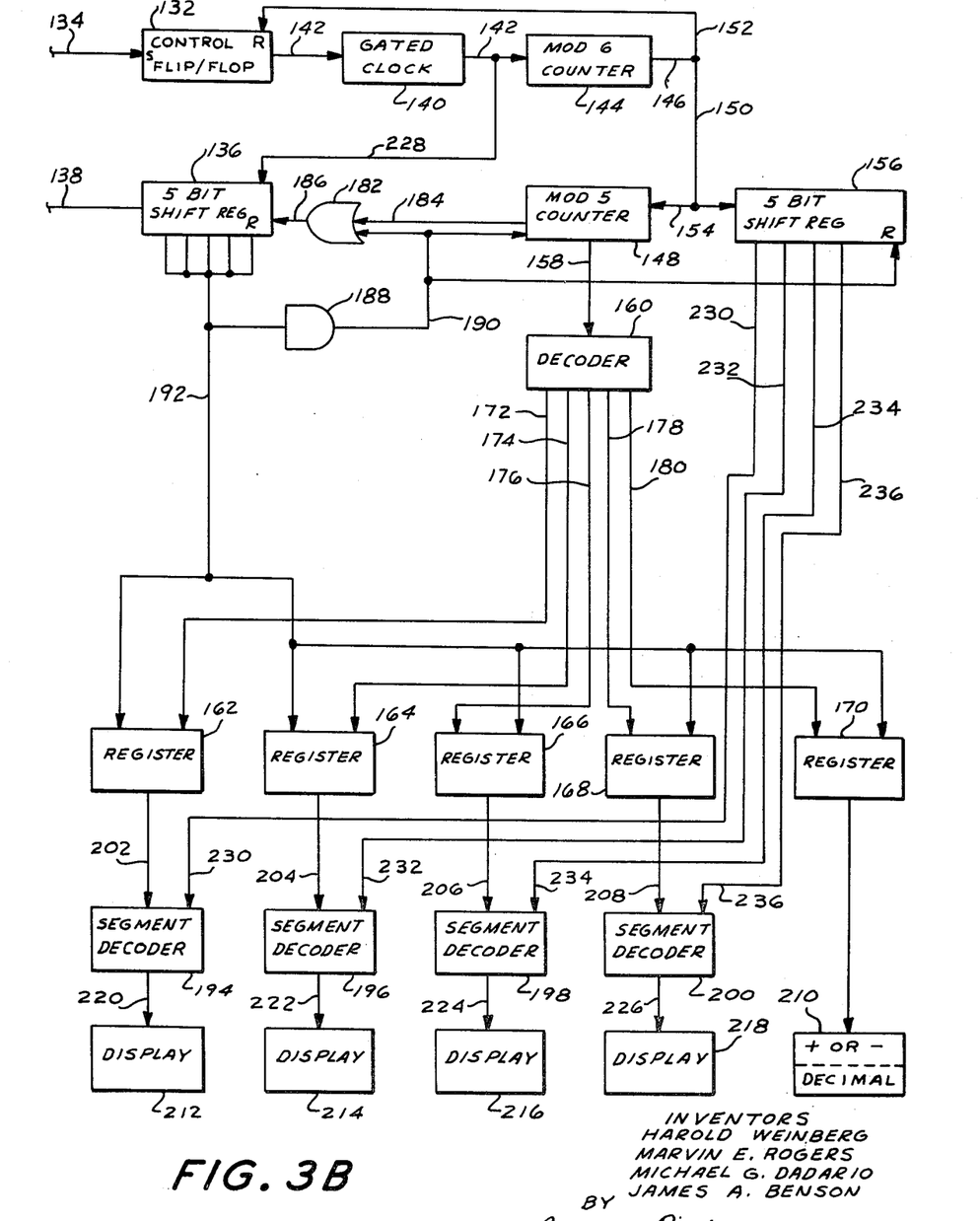

The circuitry included in the stock quotation terminal 60 is shown in FIGS. 3A and 3B. As seen therein, the terminal includes a transmitting and a receiving portion. The transmitting portion of the terminal (shown in FIG. 3A) includes the keyboard 100, a pair of tone generators 102 and 104, a filter and tone multiplexor 106 and a speaker 108 to acoustically couple the tone generator to handset 58.

The keyboard 100 comprised of keys 72 is similar to the keyboard construction on the "touch-tone" telephone. Each of the keys is connected resistively to a pair of output lines 110 and 112. That is, each button causes the contacting of a switch which is connected via one of four resistors to line 110 and via one of four resistors to lin 112. Each of the tone generators 102 and 104 is a voltage controlled oscillator. Thus, tone generator 102 is utilized to generate one of four different frequencies and tone generator 104 is utilized to generate one of four different frequencies.

Since there are four frequencies that can be generated by each tone generator, there are 16 combinations of the two frequencies which are used for the 16 keys on the keyboard 100. The tone generators 102 and 104 provide the frequencies via lines 114 and 116, respectively, to the filter and tone multiplexor 106. The filter provided in the unit 106 is an active low pass filter where the third harmonic is attenuated for the lower frequencies which fall in the 2,025 to 2,225 cycles region. The frequencies in the 2,025 to 2,225 cycles region are, thus, attenuated prior to insertion into the telephone handset. As will hereinafter be seen, the data processing system sends signals in frequency shift key code over the telephone lines and, thus, by eliminating these frequencies from the signals provided to the speaker 108 via lines 118 and 120, there can be simultaneous transmission of signals in both directions over the telephone line.

The multiplexing in the unit 102 is preferably performed resistively to prevent intermodulation distortion caused by non-linear multiplexing.

The receiving portion of the stock quotation terminal includes either an inductive coil 122 or a speaker or microphone 124 which is connected to the input of a band pass filter 126. The inductive coil is used where telephones in an area are of the non-shielded type. Where shielded telephones are used, the speaker 124 is used to acoustically couple the telephone to the band pass filter 126. In addition to the band pass filter, a converter 128 is provided which converts frequency shift key signals provided on line 130 from the band pass filter to a binary or logic level signal.

The remainder of the terminal circuitry is shown in FIG. 3B. The output of converter 128 is connected to the set input of a control flip-flop 132 via line 134 and to a five bit shift register 136 via line 138. The output of control flip-flop 132 is connected to a gated clock pulse generator 140 via line 142. The gated clock pulse generator 140 is connected via output line 142 to a MOD 6 counter 144 and five bit shift register 136. The carry line 146 of the MOD 6 counter 144 is connected to a MOD 5 counter 148 via line 150 and to the reset input of control flip-flop 132 via line 152.

The MOD 6 counter 144 is also connected via line 150 and line 154 to a five bit shift register 156. Shift register 156 is connected as a recirculating register or ring counter having a binary 1 which is recirculated through the stages.

The contents of the MOD 5 counter 148 are fed via output lines 158 to a decoder 160. The decoder 160 converts the binary code in the MOD 5 counter to a one out of five code which provides enabling signals to one of five four bit registers 162 through 170 via output lines 172 through 180, respectively. MOD 5 counter 148 is also connected to OR gate 182 via line 184. OR gate 182 is connected to the reset input of five bit shift register 136 via output line 186. An AND gate 188 is connected to the four BCD output lines of the five bit shift register 136 and is connected via output line 190 to the input of OR gate 182 and to the reset input of MOD 5 counter 148. AND gate 188 is so connected to the output lines 192 that if the code in the shift register represents the "clear" or "execute" instruction, the AND gate 188 is enabled and, thus, resets register 136.

The five bit shift register has four of its stages connected in multiple to each of the register 162, 164, 166, 168 and 170. Registers 162 through 170 can receive the input from the five bit shift register only upon receiving enabling signals on the corresponding lines 172 through 180, respectively. Thus, if the four bit code is provided on output lines 192 from the five bit shift register and line 172 from decoder 160 has a logical 1 output thereon, the register 162 is enabled to receive the four bit code from the shift register 136.

Each of the registers 162 through 168 is connected to a segment decoder 194 through 200, respectively. Thus, register 162 is connected to decoder 194 via lines 202, register 164 is connected to segment decoder 196 via lines 204, register 166 is connected to segment decoder 198 via lines 206 and register 168 is connected to segment decoder 200 via lines 208. Register 170 is connected to a control unit 210 which determines where the decimal point is inserted on the display and determines whether a "+" or "−" should appear on the display. It should be noted that the "+" in front of a quotation which is the last quotation for the stock indicates that the stock has gone up since the previous quotation and a "−" in front of the quotation indicates that the price has gone down since the previous quote.

The decimal point location can either be between the third and fourth digits which is normally the case or between the second and third digits of the display.

The segment decoders 194 through 200 are connected to the character displays 212 through 218, respectively, via lines 220 through 226, respectively. The segment decoders 194 through 200 convert the binary coded decimal code into the seven segment display code in order to provide the representation of the characters on the display.

In operation, the numerical code is generated by pressing appropriate keys on the keyboard 100 and is provided via tone generators to the filter and tone multiplexor 106 which provides the same to the speaker 108 which in turn causes the handset 58 to provide the tones to the telephone lines which are in turn connected to the data processing unit. The data processing unit, as will hereinafter be seen, provides the character received via the handset 58 in a frequency shift key code which is received by the band pass filter 126 via induction coil 122 or speaker 124.

The band pass filter 126 amplifies the signals provided on the input lines thereto which are within the frequency band of 2025 cycles to 2225 cycles. The amplified signals are fed on line 130 to the frequency shift key to logic level converter 128 which converts the frequency shift key code to a binary code. The frequency shift key to logic level converter is preferably comprised of a phase-locked loop which converts the frequency shift key signal (FSK) to the respective logic levels.

The format for the incoming characters is as follows: The start bit which is 0 logic is followed by the four data bits which are in binary coded decimal and two stop bits which are both logical 1.

The control flip-flop 132 is set by the negative transition of the logic level. Accordingly, upon the receipt of a character on line 134 from the converter 128, since the first bit is a 0 bit, the transition on line 134 is negative causing the control flip-flop 132 to be set. The setting of flip-flop 132 causes the output signal on line 142 to enable the gate in the clock 140. The clock then generates clock pulses on line 142 at a rate which is substantially the rate of the input bit rate provided on lines 130 to the logic level converter 128 and from the logic converter 128 to lines 134 and 138.

The clock pulses from clock 140 are provided to the shift register 136 via shift input line 228. Thus, the first bit stored in shift register 136 is the 0 bit. On the next clock pulse, the first of the four binary coded decimal bits is provided on line 138 and is shifted into the shift register and so on until the shift pulses are terminated on line 228 from the clock 140. This happens as a result of clock 140 providing via line 142 the pulses to the MOD 6 counter 144. As soon as MOD 6 counter changes from a count of 5 to 6, a carry pulse is provided on line 146 which is fed via line 152 to the reset input of control flip-flop 132. The resetting of control flip-flop 132 causes the gated clock to be shut off and thereby provide no further pulses via line 228 to the five bit shift register 136.

The carry pulse from the MOD 6 counter 144 is also applied via line 150 to the MOD 5 counter 148 and to the five bit shift register 156. The MOD 5 counter 148, thus, receives the first count and provides via output line 158 the coded representation of a 1. The decoder 160 decodes the information provided on lines 158 and provides an enabling signal on line 172 which thereby causes an enabling of register 162 to receive the output signals provided on line 192 from the five bit shift register 136.

Accordingly, since the four bits of the binary coded decimal portion of the character are located in the four bits of the shift register associated with output lines 192, the binary coded decimal portion of the character is provided to register 162. Similarly, since the five bit shift register 156 has a 1 inserted into the first bit thereof, a first of its output lines 230 is enabled which provides an unblanking signal to the segment decoder 194 which enables the segment decoder 194 to convert the binary coded decimal representation in register 162 to the same segment code required for display 212 to display the numeral represented by the binary coded decimal character.

Upon receipt of the beginning of the next character, the control flip-flop 132 is again set by the negative transition in the first bit of the second character. The second character is thus shifted into the five bit shift register 136 in the same manner as the first character and upon the sixth pulse provided by the clock 142 to MOD 6 counter 144, the carry pulse causes MOD 5 counter 148 to have the count of 2 therein and the five bit shift register 156 to have the 1 bit shifted to the second position thereby causing unblanking of the segment decoder 196 and receipt by register 164 of the second binary coded decimal character.

This continues as the third and fourth characters are placed, respectively, into registers 166 and 168 and converted by the segment decoders 198 and 200 into the numerical representation of the character on the display. The fifth character is a control character and is placed into register 170. The control character in the register 170 is utilized to enable the display to have a "+" or a "−" in the first position of the display and to enable the illumination of the decimal point between either the third and fourth characters on the display or the second and third characters on the display. Thus, the five characters provided include four numerical characters which are displayed in display units 212 through 218 and a fifth character which is a control character for providing the "+" and "−" and decimal point information to the display.

When the characters provided to the frequency shift key to logic level converter 128 are the characters received from the keyboard of the transmitter and return via the telephone handset 58 to the band pass filter 126, the four characters are preceded by a clear control signal which causes blanks to be placed into register 162, 164, 166, 168 and 170 and causes the 1 bit in the five bit shift register to be inserted in the first position of register 156. Thus, each group of characters is five characters in length and the MOD 4 counter and five bit shift register 158 are in the starting position in order to enable the sequential placement of the four binary coded decimal characters of the next word in the resistors 162 through 168, respectively.

While binary coded decimal four bit code has been used, it should be understood that five, six or eight bit teletype codes could be handled by merely changing the length of the shift registers and changing the modulo base for the bit counter and the character counter.

It can, therefore, be seen that the terminal for the stock quotations is inexpensive since the circuitry utilized at the terminal is kept to a bare minimum. That is, the calculation, the addressing of the information in the data processing unit are all done at the data processor and, accordingly, each terminal has the minimum circuitry that can be utilized for converting the serial input of characters into a parallel character display. Thus, not only are there size and weight advantages as a result of the small amount of circuitry required in the terminal, there is also the cost advantage of providing inexpensive terminals for the user. Also, since the number of terminals is very large with respect to the one data processor that can be used for each area, the cost of the overall system is considerably reduced.

Figure 4:
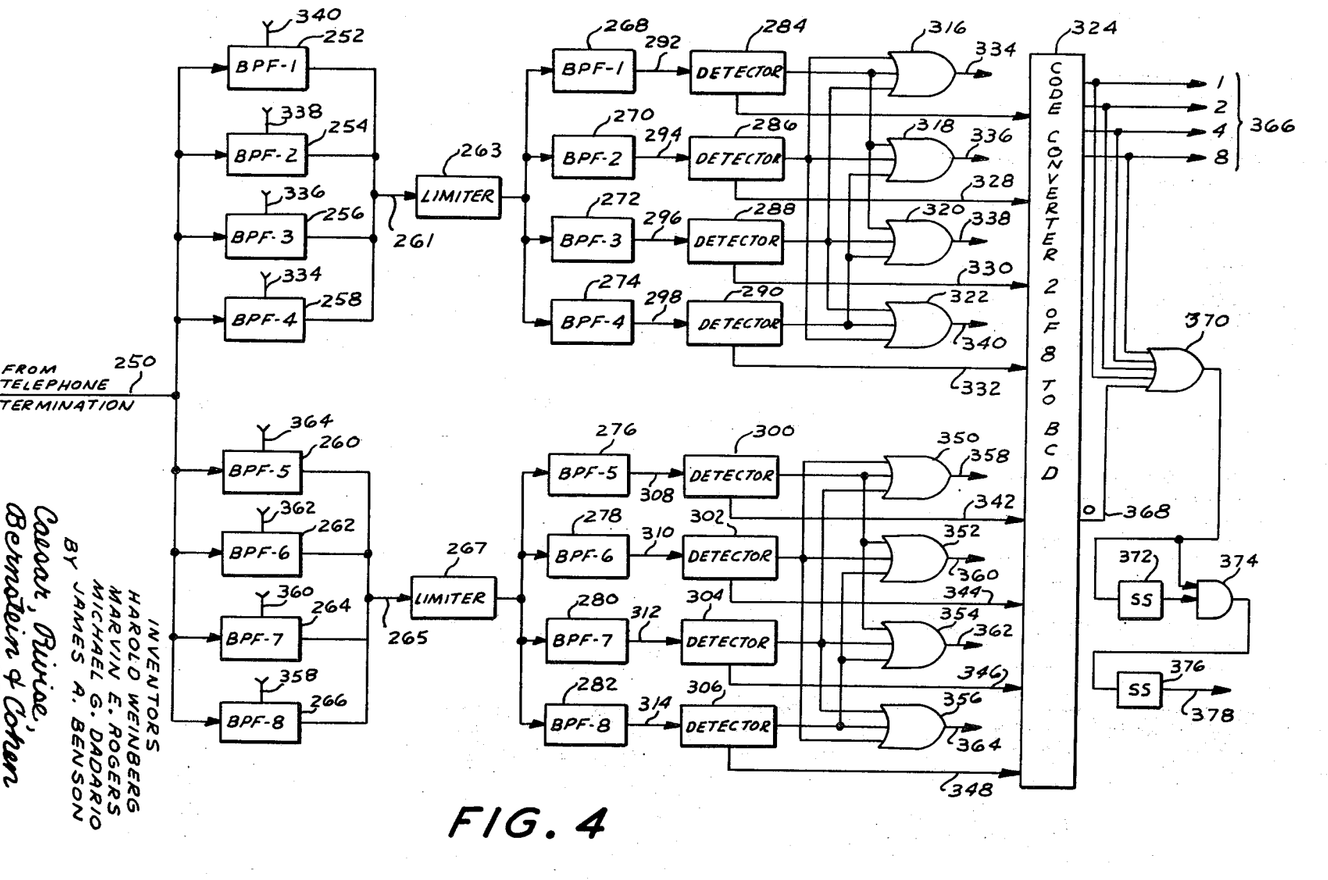
FIG. 4 is a schematic block diagram of the receiving circuit utilized at the data processing system for receiving the address and control signals from the stock quotation terminal.

The input-output multiplexor interface 32 includes a receiver which is illustrated in FIG. 4 for converting the "touch-tone" signal into binary coded decimal signals which can then be used as the input to the data processor. As best seen in FIG. 4, the tone signals come in from the telephone termination via line 250. Connection from the telephone line to the line 250 is through a filter mixing network and wire coupler. The wire coupler is basically an automatic answering device after ringing has occurred from incoming calls. As will hereinafter be seen, an automatic disconnect is also provided in the input-output multiplexor interface. After the signals come through a filter mixing network, they are initially amplified by a fixed gain line band amplifier, and provided on line 250 to a plurality of band pass filters 252 through 266. These band pass filters are designated BPF–1 through BPF–8. Each of the eight band pass filters is adapted to pass a different one of the eight frequencies which are utilized in the tone generator responsive to the keyboard 100.

The signals on line 250 are sent in parallel to each of the band pass filters 252 through 266 which are preferably high Q active filters. The band pass filters 252 through 266 are separated into two groups of four. A first group of fout, namely, band pass filters 252 through 258 are connected via input line 261 to a limiter 263. Band pass filters 260, 262, 264 and 266 are connected to input line 265 of limiter 267. The output of limiter 263 is connected to the input of each of the four band pass filters 268, 270, 272 and 274.

Similarly, limiter 267 is connected to the input of four band pass filters 276, 278, 280 and 282. It should also be noted that filters 268 through 282 are, respectively, labeled BPF–1 through BPF–8. Thus, filter 268 is adapted to pass the same frequency as filter 252, filter 270 is adapted to pass the same frequency as filter 254 and so on through filter 282 which is adapted to pass the same frequency as filter 266 which each have the same designations therein.

Filters 268, 270, 272 and 274 are connected to detectors 284, 286, 288 and 290 via lines 292, 294, 296 and 298, respectively. Similarly, filters 276, 278, 280, and 282 are connected to detectors 300, 302, 304 and 306 via lines 308, 310, 312 and 314, respectively. The detectors 284 through 290 are connected in a combinatorial fashion to four OR gates 316, 318, 320 and 322. Each detector 284 through 290 is also connected to a code converter 324 via output lines 326, 328, 330 and 332, respectively.

Detector 284 is connected to one of the inputs of OR gates 316, 318 and 320. Detector 286 is connected to the input of OR gates 316, 318 and 322. Detector 288 is connected to the input of OR gates 316, 320 and 322 and detector 290 is connected to the input of OR gates 318, 320 and 322.

The output of OR gate 316 is connected via line 334 to the inhibit input of band pass filter 268. OR gate 318 is connected via line 336 to the inhibit input of filter 256. OR gate 320 is connected via output line 338 to the inhibit input of band pass filter 254 and OR gate 322 is connected via output line 340 to the inhibit input of filter 252.

Detectors 300, 302, 304 and 306 are connected to the code converter 324 via lines 342, 344, 346 and 348, respectively. The detectors 300, 302, 304 and 306 are also connected to four OR gates 250, 352, 354 and 356 in combinatorial fashion. That is, detector 300 is connected to the inputs of OR gates 350, 352 and 356. Detector 302 is connected to the inputs of OR gates 350, 352 and 356. Detector 304 is connected to the inputs of OR gates 350, 354 and 356 and detector 306 is connected to the inputs of OR gates 352, 354 and 356.

OR gate 350 is connected via output line 358 to the inhibit input of band pass filter 266. OR gate 352 is connected via output line 360 to the inhibit input of band pass filter 264. OR gate 354 is connected via output line 362 to the inhibit input of band pass filter 262. OR gate 356 is connected via output line 364 to the inhibit input of band pass filter 260.

The code converter 324 has four output lines 366 which are provided for reading out the binary coded decimal equivalent of the numerals represented by the tones provided on line 250. The converter also includes an output line 368 which has a 1 provided thereon when the numeral inserted into the code converter is a 0. Each of the lines 366 is connected to one of the inputs of an OR gate 370. The fifth input to OR gate 370 is output line 368 from the converter 324. The output of OR gate 370 is connected to a single shot multivibrator 372 and to the first input of an AND gate 374. The second input of AND gate 374 is connected from the output of single shot multivibrator 372. The output of AND gate 374 is connected to a single shot multivibrator 376. When AND gate 374 is enabled, the single shot multivibrator 376 provides an output pulse on line 378. Similarly, when OR gate 370 is enabled, single shot multivibrator 372 provides a pulse on the output line to AND gate 374.

In operation, it can be seen that the tone signals on line 250 are fed to each of the band pass filters 252 through 266. The group of band pass filters 252 through 258 then drives limiter 263 via line 261 which in turn provides the signals to the group of band pass filters 268 through 274. The output of each of the filters 268 through 274 is then rectified and the level detected by detectors 284 through 290. If a predetermined level is reached in any of the signals, the detector associated with the band pass filter providing said level generates a positive voltage which thereby enables each of the OR gates connected therewith.

Thus, assuming band pass filter 272 (BPF-3) passes a high level frequency to detector 288, detector 288 is enabled thereby causing OR gate 360 and OR gate 320 and OR gate 322 to be enabled which in turn cause the inhibiting of band pass filters 252, 254 and 258. Similarly, the group of filters 252 through 266 drive limiter 267 which is in turn connected to filters 276 through 282. When a particular frequency passed by one of the filters 276 through 282 is detected by detectors 300 through 306, the detector causes the disabling of or the inhibition of each of the band pass filters 260 through 266 which are not associated with the frequency detected. Since two tones are generated for each character provided on line 250, a positive voltage will be generated by one detector in each of the two groups of detectors 284 through 290 and 300 through 306.

Thus, two of the input lines to the code converter 324 are enabled and the two of eight code provided to the code converter 324 is converted to binary coded decimal on lines 366. OR gate 370 connected to the output of code converter 324 is enabled whenever input signals are provided to the code converter 324. That is, wherever two of eight of the lines are enabled, the code is converted to a binary coded decimal numeral. For any number other than 0000, one of the four lines 366 will enable OR gate 370. Where a 0000 is generated by the code converter, output line 368 from the code converter has a 1 thereon to cause OR gate 370 to be enabled.

The output of OR gate 370 is provided to both AND gate 374 and to single shot multivibrator 372. When OR gate 370 is enabled, a seventy millisecond pulse is generated by single shot multivibrator 372. The pulse generated by single shot multivibrator 372 is a negative going pulse and, thus, unless the signal provided from OR gate 370 is still present at the end of the seventy millisecond period, AND gate 374 is not enabled. If the AND gate 374 is enabled, the single shot multivibrato 376 is enabled which causes the generation of a pulse on line 378 which advises the data input gating in FIG. 5 that the data from the terminal is ready.

The single shot multivibrator 372, in combination with AND gate 374, acts to improve the noise rejection of the unit. That is, if spurious signals cause the activation of two of the detectors and, thus, cause a spurious generation of a code by the code converter 324, the code will not be present long enough to cause the enabling of AND gate 374 and, thus, many spurious signals are rejected thereby.

The two sets of band pass filters in combination with the inhibition of band pass filters which are not associated with the detectors enabled, helps to insure proper operation even when a noisy phone line is used. The separate input narrow band filters for each tone that is used in lieu of a broad band group filter enables greater initial tone receiver selectivity. Also, the detector inputs contain delay circuits which prevent short bursts of noise from generating false outputs. Thus, only a tone present for greater than 20 milliseconds activates the detector circuit.

Finally, since the outputs of all eight detectors are connected to the eight three input OR gates, when a valid tone is received in each group, the unused input narrow band filters are disabled. This greatly increases the selectivity and noise immunity of the receiver for proper operation when used with poor phone connections. The signals provided on lines 366 and 378 from the code converter are provided to the computer input-output and telephone interface circuitry shown in FIG. 4.

Figure 5:
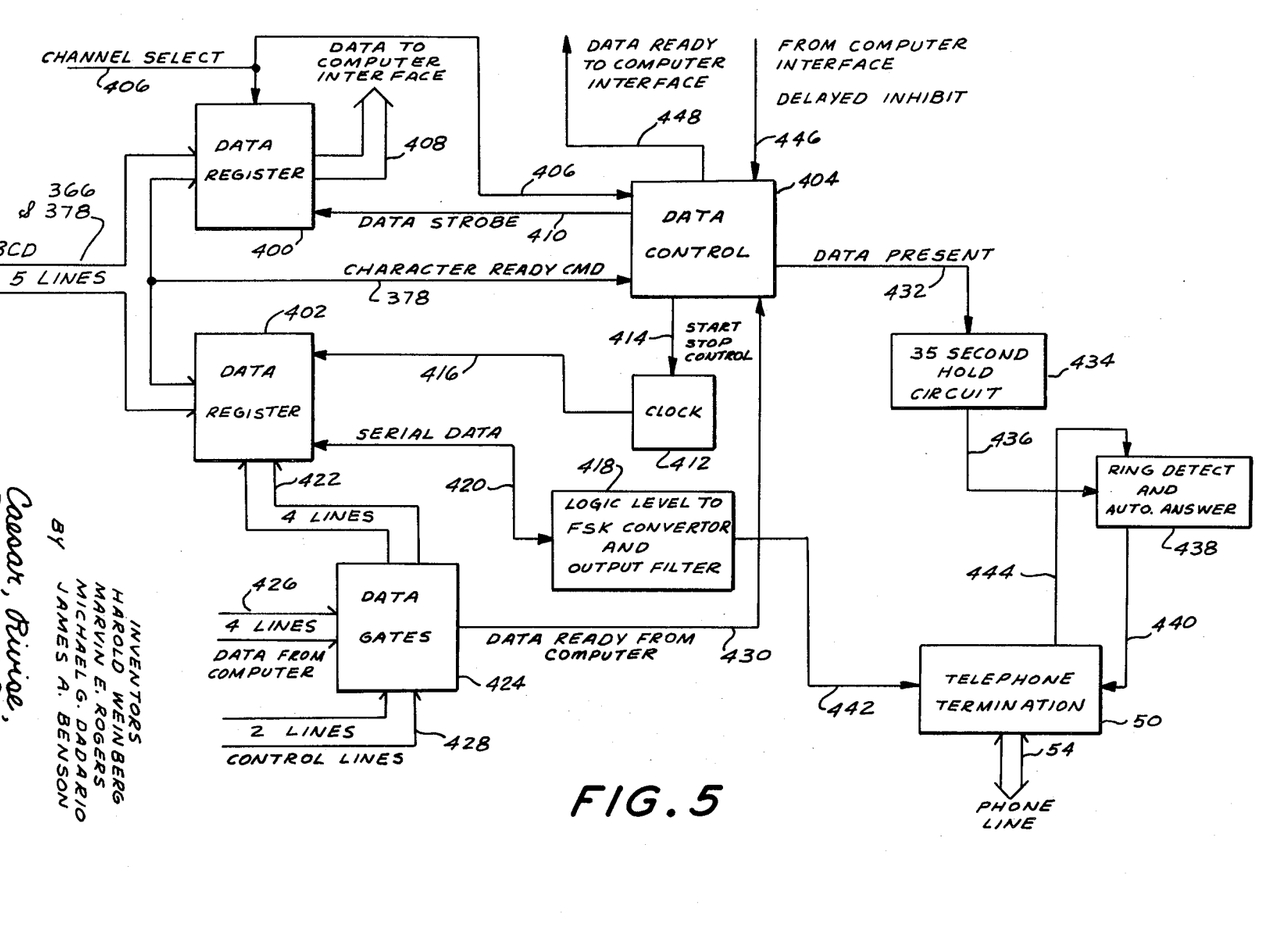
FIG. 5 and FIG. 6 are schematic block diagrams of the various interfaces between the telephone lines and the data processing system.

As seen in FIG. 5, lines 366 and 378 are connected to a pair of data registers 400 and 402. Line 378 which indicates that a character is ready is also connected to data control 404. Data control 404 controls the transmission of data to the quotation terminal and to the data processing computer. Data register 400 is utilized as a buffer register for providing data to the computer interface. In addition to the five input lines 366 and 378 to the data register 400, an input line 406 is also provided which enables the transfer of data from the data register 400 to the computer interface when a pulse is provided thereon. This pulse is identified as a channel select pulse which is provided by the computer when the particular telephone line associated with the stock quotation terminal is accessed. That is, since the data processing computer is a time share computer, the computer can provide to a large plurality of telephone lines, stock market quotations which are then transferred to the stock quotation terminal associated therewith.

Thus, the circuitry shown in FIGS. 4 and 5, is provided for each of the telephone lines which are connected to the data processing system. Since the time sharing computer operates on a time division basis, each of the telephone lines is assigned a time channel and, thus, data is provided to the data register 402 only during the time channel associated with the particular data register 402 and data from register 400 is transferred from the register to the computer interface only during the same time channel.

The data register 400 is connected via output lines 408 to the computer interface. An input line 410 is also provided to the data register 400 from the data control 404. A signal provided on line 410 is identified as a data strobe which causes the transfer of the four bits of binary coded decimal data from the data register to the computer interface. The data control is also connected to a clock pulse generator 412 via line 414. Line 414 is utilized to start and stop the clock pulse generator 412 which provides shift pulses to data register 402 via line 416 to serially shift the contents from the data register 402 to a logic level to FSK converter and output filter 418 via line 420.

Data register 402 also has four input lines 422 which are provided from the data gates 424. The data gates 424 have connected thereto four lines 426 which are connected from the computer and carry data therefrom. Also connected to the data gates 424 are two lines 428 which carry control information from the computer for entering the data from the computer into the data gates. The data gates also have an output line 430 which is connected to the data control 404 which advise the data control 404 that data is ready from the computer.

The data control 404 also includes an output line 432 which is connected to a 35 second hold circuit 434 which is comprised of a timer which will provide an output signal on line 436 if a data present signal is not provided on line 432 for a period of 35 seconds. Output line 436 from the 35 second hold circuit is connected to a ring detector and automatic answering device 438. The ring detector and automatic answering device 438 is connected via line 440 to the telephone termination 50. The logic level to FSK converter and output filter 418 is connected to the telephone termination 50 via line 442. The telephone termination is in turn connected to the ring detector and automatic answering device 438 via line 444. The telephone termination 50 is connected to the telephone line 54.

The data control 404 which controls the flow of data to both the quotation terminal and the computer includes an input line 446 which is received from the computer interface to carry a delayed inhibit signal. The data control 404 also includes an outgoing line 448 which is connected to the computer interface upon which a data ready signal is provided to the computer interface. The data ready signal provides to the computer interface the signal which enables the computer to receive the data from register 400 via lines 408 when the channel select pulse from the computer is present and provided to the data register 400.

The delayed inhibit signal provided on line 446 enables the data control 404 to transfer data in register 402 to the telephone termination 50. That is, when the delayed inhibit signal is received with the character ready signal, the clock 412 is started thereby causing the shifting of data out of the register 402 into the logic level to FSK converter 418 which is in turn provided on line 442 to the telephone termination 50.

Figure 7:
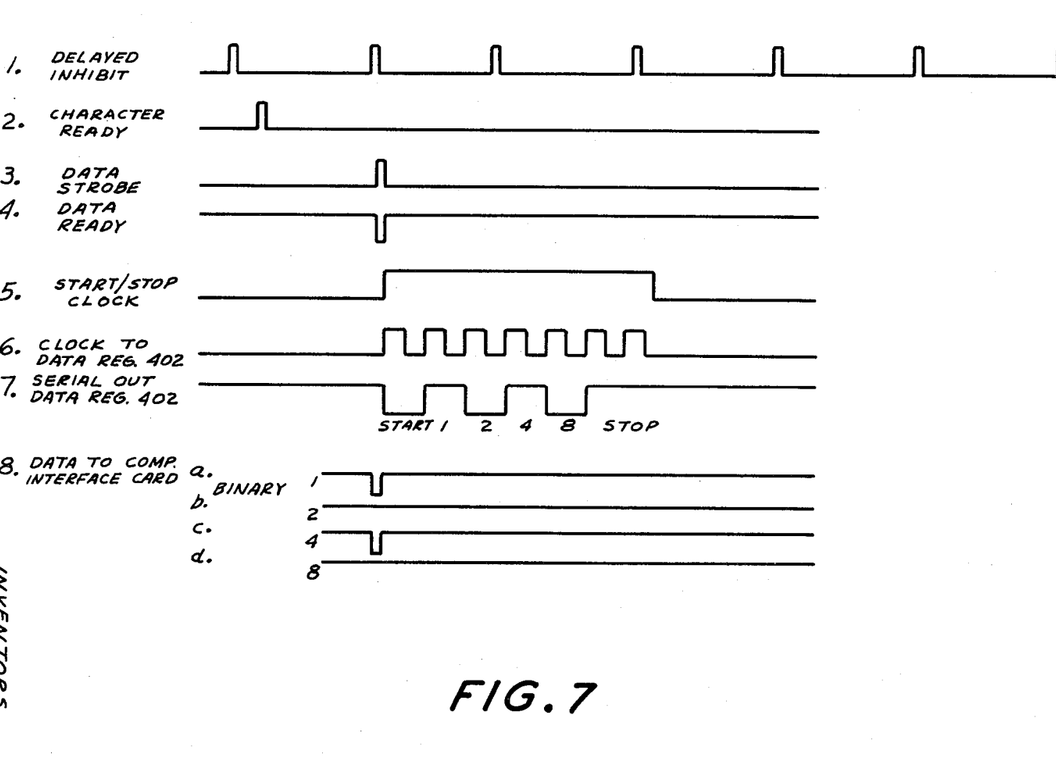
FIG. 7 is a timing diagram which shows the relative timing of various signals provided to enable the handling of data from the receiver into the data processing system.

The operation of the data transfer from the data register 402 to the logic level to FSK converter and output filter 418 and from the data register 400 to the computer interface via line 408 is best understood with reference to FIG. 7.

The timing represented in FIG. 7 is utilized in connection with a numeral 5 being provided in binary coded decimal form via lines 366 to the data registers 400 and 402. Line 1 in FIG. 7 shows the signals on line 446 which are the delayed inhibit signals provided from the computer interface. Line 2 on the diagram shows the generation of signals on line 378 to the data control 404. The third line shows the generation of signals on the data strobe line 410. The fourth line shows the generation of the data ready signal on line 448. The fifth line shows the signals provided from the data control 404 on line 414. The sixth line shows the signals generated on line 416 by the clock 412. The seventh line shows the signal provided on line 420 from the data register 402 and lines 8a, b, c and d show the signals provided on the four output lines 408 from the data register 400 which are provided to the computer interface.

Thus, upon the first delayed inhibit signal on line 1, since a character ready signal has not been generated therebefore, data control 404 remains inactive. However, between the first and second delayed inhibit, a character ready signal is received by the data control 404 which indicates that data is provided on lines 366 to the data registers 400 and 402. The data registers 400 and 402 receive the character 5 in binary coded decimal form. Upon receipt of the next delayed inhibit signal on line 446 from the computer interface, the data control 404 provides a data strobe signal on line 410 to the data register 400 and also provides a data ready signal on line 448 to the computer interface. The signal on line 414 is also increased to the logic level 1 thereby causing enabling of clock pulse generator 412.

The clock pulse generator 412, in response to the high signal on line 414, generates clock pulses to data register 402 via line 416 which causes the generation of a serial data train on lines 420 from the data register. It should be noted that the data register 402 includes gating which causes the generation of start and stop bits at the beginning and end of the character. Also, the data strobe signal on line 410 causes the parallel read out of the signals on data lines 408 which are accepted by the computer interface as a result of the data ready signal being received by the computer interface simultaneously.

Figure 8:
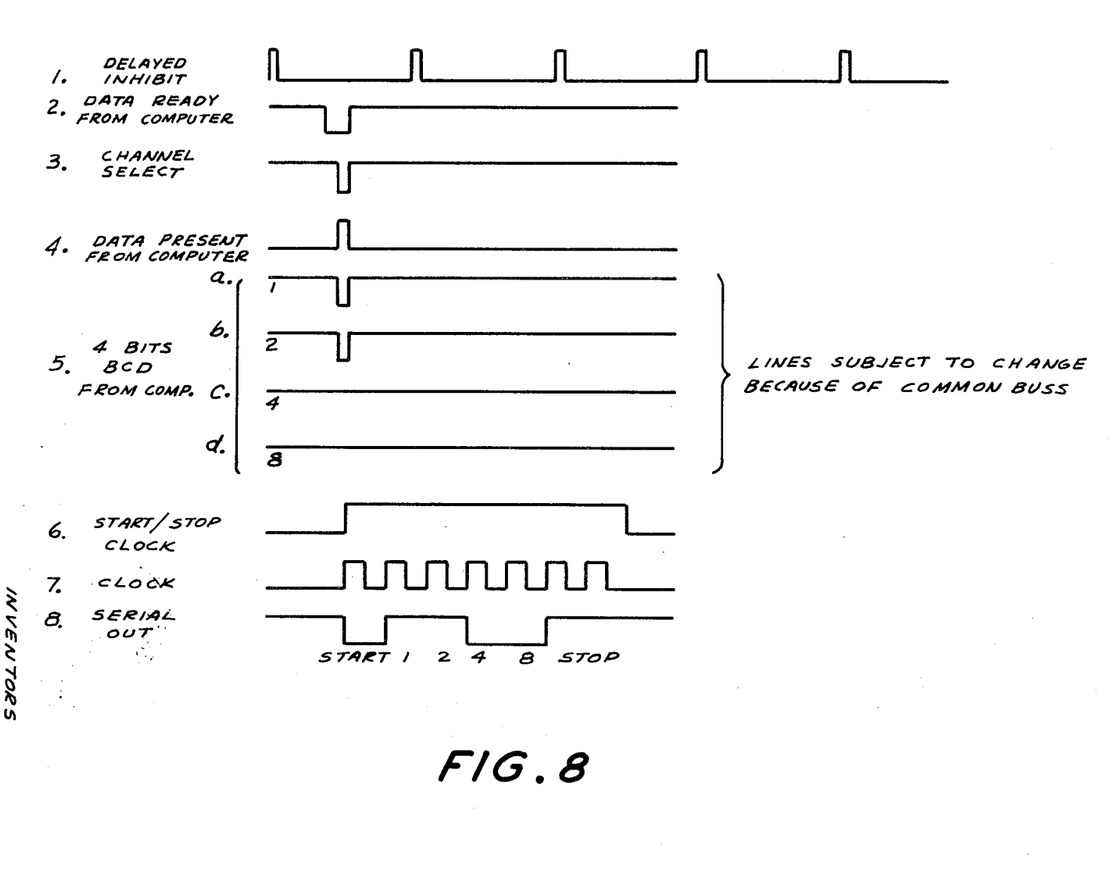
FIG. 8 is a timing diagram which shows the relative timing between the various pulses which are generated in the system to enable the flow of data from the data processing unit to the telephone line.

The operation of the circuitry in FIG. 5 with respect to the transfer of data from the computer to the telephone lines is best understood in connection with the timing diagram shown in FIG. 8.

In FIG. 8, line 1 shows delayed inhibit signals provided on line 446 to the data control 404. Line 2 shows the data ready signal generated on line 430 from the computer to data control 404. Line 3 shows the channel select signal which is provided via one of the two lines 428 to the data gates 424. Line 4 shows the generation of the data present signal which indicates that data is present from the computer that is generated on line 432 by the data control and is fed to the 35 second hold circuit 434 which provides the telephone termination with at least another 35 seconds of connection to the particular telephone and quotation terminal to which the data processing system is connected. On lines 5a, b, c and d, are shown the signals which are provided on the data lines 426 to the data gates 424 and which are in turn fed to the data register 402. Line 6 shows the signal on line 414 from the data control to the clock 412 as a result of the generation of the data ready signal. Line 7 shows the signals provided on lines 416 from the clock and line 8 shows the serial output provided on line 420 from the data register 402.

It can, thus, be seen that because a data ready signal has not been provided to the control 404, the first delayed inhibit signal does not cause any signals to be generated by the data control. However, upon the data ready signal provided from the computer via the data gates 424 to the data control 404, and the provision simultaneously of the channel select signal to the gates 424, the binary coded decimal signals on lines 426 are transferred from the data gates 424 to the data register 402. The data ready signal causes the data control to generate a signal on line 414 to start clock pulse generator 412 and at the same time provide the signal on line 432 to cause the 35 second hold circuit to be recycled. The clock pulse provided on lines 416 via the starting of the clock pulse generator 412 cause the serial read out of the binary coded decimal character stored in the data register to the logic level to FSK converter and output filter 418. The serial logic levels are then converted into frequency shift key signals which are provided via lines 442 to the telephone termination and on to the stock quotation terminal.

It should be noted in FIG. 8 that there is a notation that lines 5a, b, c and d will change because it is common buss. That is, lines 426 are provided by the computer to each of the circuits associated with each of the telephone lines. Thus, althrough the signals shown on lines 5a through d of FIG. 8 are present during the channel select pulse shown in line 3 of the diagram, there will also be pulses provided on these lines during the times that the other channels are selected. However, only the signals shown in FIG. 8 on lines 5a through d which are provided to the data register 402 are shown therein. The data gates 428 are enabled by the channel select signal associated with the particular telephone line.

Figure 6:
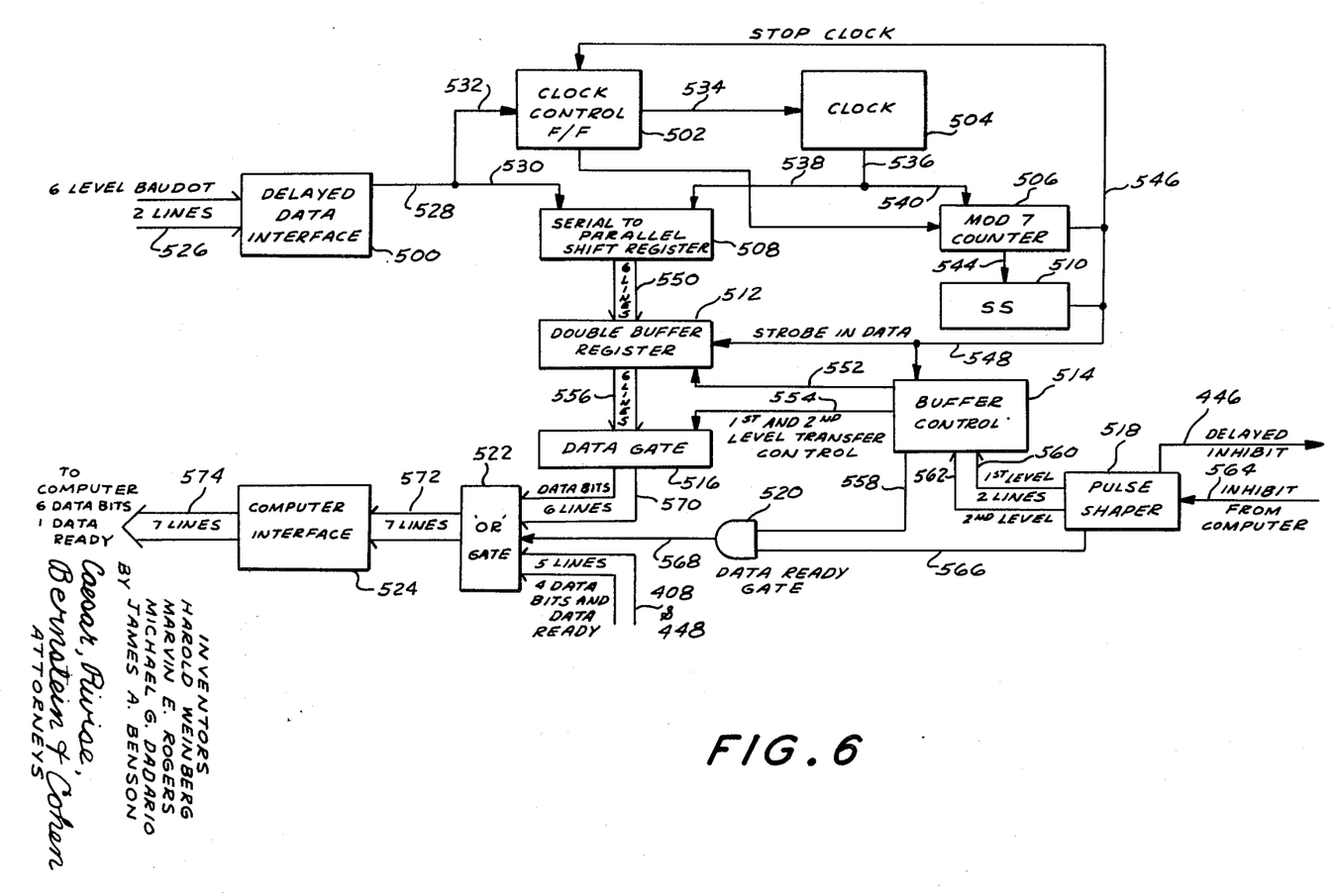

One of the delayed data and computer interface modules utilized in the input-output multiplexor interface 32 is shown in FIG. 6. The purpose of the delayed data and computer interface module is to transform a serial six level baudot code into six bit parallel data. Six level baudot code is a serial train of data consisting of a start bit, six bits of data and two stop bits. The baudot code is the code used to present the New York Stock Exchange data, American Stock Exchange data and over-the-counter data to the interface modules.

A delayed data and computer interface module is also provided for every ten telephone interface modules utilized in the data processing system. The telephone interface module presents four bits of parallel data and the data ready to the computer interface module as opposite to the baudot code provided by the Exchange datas.

The module includes a delayed data interface 400, a clock control flip-flop 502, a clock pulse generator 504, a MOD 7 counter 506, a serial to parallel shift register 508, a single shot multivibrator 510, a double buffer register 512, a buffer control 514, data gates 516, a pulse shaper 518, an AND gate 520, an OR gate 522, and computer interface 524. The delayed data interface 500 receives the six level baudot code on two input lines 526 and converts the same to a logic level code on line 528.

The delayed data interface 500 is connected to the clock control flip-flop 502 and to the first stage of the serial to parallel shift register 508 via line 530. The clock control flip-flop 502 is connected from the delayed data interface at its trigger input 532 and the output of the flip-flop 502 is connected via line 534 to the clock pulse generator 504. The clock pulse generator 504 is connected via lines 536 and 538 to the serial to parallel shift register 508 to the shift input thereof.

The output of the clock pulse generator is also connected via lines 536 and 540 to the trigger input of MOD 7 counter 508. The MOD 7 counter is preferably comprised of three flip-flops which are connected in a typical binary counting arrangement. The MOD 7 counter also has an input line 542 to its set input from the clock control flip-flop 502 which causes a 1 to be inserted in the MOD 7 counter upon the resetting of the flip-flop 502.

The MOD 7 counter has its carry output line 544 connected to the input of a single shot multivibrator 410. The single shot multivibrator is enabled to generate a pulse upon the detection of a carry pulse on line 544. The single shot multivibrator is connected to the set input of the clock control flip-flop 502 via line 546 and to the double buffer register 512 via line 548.

The serial to parallel shift register 508 is connected with each of the stages connected via one of six lines 550 to double buffer register 512. The receipt of the single shot multivibrator pulse on line 548 in the double buffer register causes the contents of the shift register 508 to be read in parallel to the first register in the double buffer register 512.

The double buffer register is basically comprised of twelve flip-flops which are connected as two six bit parallel registers. The buffer control 514 includes a pair of output lines 552 and 554 which are connected to the double buffer register 512 and the data gates 516, respectively. The double buffer register 512 has the second register thereof connected in parallel via six lines 556 to the data gates 516.

The buffer control 514 includes an output line 558 which is connected to a first input of the data ready gate 520. The buffer control also has two input lines 560 and 562 which are connected from the pulse shaper 518. In addition to output lines 560 and 562 from the pulse shaper to the buffer control, the pulse shaper includes an output line 446 which carries the delayed inhibit signal which is connected to data control 404 in FIG. 5. Also connected to the pulse shaper 518, is an input line 564 which carries the inhibit signal from the computer. The pulse shaper also includes a second output line 566 which is connected to the second input of the data ready AND gate 520.

AND gate 520 is connected to a first input of OR gate 522. In addition, data gates 516 are connected via six output lines 570 to OR gate 522. The OR gate 522 also receives five input lines which are lines 408 and 448 from data register 400 and data control 404, respectively, in FIG. 5. The OR gate 522 comprises seven OR gates which are connected via lines 572 to the computer interface 524. The computer interface 524 is connected via seven lines 574 to the computer. The seven lines include six data bits and one data ready bit.

As set forth above, the purpose of the delayed data interface block 500 is to change standard EIA 20 milliamp neutral current type signals into positive logic levels. For example, positive logic levels which are preferred in the instant embodiment are +5 volts equalling a logical 1 and 0 volts for a logical 0. When there is no data present at the delayed data interface 500, the output provided on line 528 is +5 volts. As soon as data is provided on lines 526 to the delayed data interface 500, the output signal on line 528 changes from +5 volts to 0 volts thereby causing a negative transition on line 532 which resets clock control flip-flop 402. The reset of clock control flip-flop 502 provides a signal on line 534 which causes the enabling of clock pulse generator 504 which provides clock pulses on line 536.

The resetting of the clock control flip-flop also causes a signal on line 542 to the MOD 7 counter 506 which places a 1 in the MOD 7 counter so that the first clock pulse generator 504 to the MOD 7 counter changes the count in the counter from 1 to 2. The clock pulses from the clock pulse generator 504 are also provided to the serial to parallel shift register 508 thereby causing the data provided at the delayed data interface 500 to be shifted into shift register 508.

The seventh clock pulse causes the change in the MOD 7 counter from binary 111 to binary 000 which causes to carry pulse on line 544 which is provided to the single shot multivibrator 510. The single shot multivibrator is then caused to generate a pulse on line 546 which is sent to the clock control flip-flop 502 and sets the same. The pulse from the single shot multivibrator 510 also causes the pulse on line 548 to transfer the contents of the shift register 508 to the double buffer register 512.

The content of the shift register that are transferred are the six data bits from the delayed data interface. When the clock control flip-flop 502 is set, the signal on line 534 causes the disabling of clock pulse generator 504 and thereby stops the generation of clock pulses on line 536. The clock pulse generator is not enabled again until such time as the next character is provided to the delayed data interface.

The character from the delayed data interface is now stored in the double buffer register 512. The double buffer register enables the delayed data and computer interface module to obtain computer time synchronization for the transfer of data into the computer.

The buffer control 514 is utilized in conjunction with the pulse shaper 518 to perform the decision making for the data level transfer. The pulse shaper controls the setting and resetting of the flip-flops in the buffer control. As set forth above, the data from the serial to parallel shift register 508 is transferred to the first register in double buffer register 512 by the pulse provided on lines 548 from the single shot multivibrator.

The same pulse also is connected to the buffer control which sets a first flip-flop in the buffer control. When this first flip-flop in the buffer control is set, data can be transferred from the first level to the second level of storage in the double buffer register when the inhibit pulse from the computer is presented on line 564 to the pulse shaper 518.

When the data is transferred from the first register to the second register as a result of the pulse from the pulse shaper being transferred to line 552 of the double buffer register, another flip-flop in the buffer control 514 is also set. The second flip-flop is connected to the data ready gates 520 via line 558 and thus the signal provided on line 558, in combination with the inhibit pulse from the computer being provided via the pulse shaper to line 568, causes the generation of the data ready bit.

The data ready bit is provided by enabling of the data ready gate 520. The inhibit signal is also provided to line 554 to enable data gates 516 to transfer to OR gate 522 the six lines of data via line 556 through the data gates to lines 570 to OR gate 522. The second level transfer control signal on the line 554 is generated because of the second flip-flop in the buffer control being set.

It can, therefore, be seen that a new and improved personal stock quotation system has been provided. The stock quotation system includes a terminal which can be used with any telephone and which does not require any special installation and, thus, can be moved from home to office or even a telephone booth as a results of the portability. Wherever a telephone is provided, the personal stock quotation system can be used.

Also, the delayed data and computer interface modules cause the compiling of characters outside the computer and, thus, many telephone lines can be handled as computer machine time is more profitably utilized. Since there is very little storage required in the data processing terminal other than the storage of stock market quotation data, a minicomputer can be utilized. The acoustic and magnetic coupling provided in the stock market quotation terminals enable the stock market quotation terminal to be utilized with any telephone since special telephones and/or installation of hard wiring to the telephone lines is not required.

The system also minimizes errors since the characters are displayed before the operator as they are entered into the computer. As set forth above, this is performed by transmission back to the terminal of the characters placed into the computer by the operator. Thus, where an error character has been caused by faulty transmission or the wrong data is requested, the operator will be able to recognize the mistake and, thus, be able to quickly rectify the mistake.

As also seen above, the operation of the stock market quotation terminal is easily learned since the keyboard is simplified to the extent of an ordinary telephone.

Without further elaboration, the foregoing will so fully illustrate our invention, that others may, by applying current of future knowledge, readily adapt the same for use under various conditions of service.

What is claimed as the invention is:

1. In a stock quotation system having a data processing system with a memory having stored therein stock market information related to a plurality of stocks, said data processing system being connected to telephone lines, a stock quotation terminal, said quotation terminal having a cradle for a telephone handset, coupling means adjacent said cradle, signalling means for generating address and control signals for obtaining said stock information, means for receiving signals from said data processing system and display means connected to said means for receiving for displaying the address represented by said address signals generated by said signalling means and for displaying said stock information obtained from said data processing system, said displayed address being received from said data processing system so that said display means provides verification that said data processing system has received accurately the address generated by said signalling means.

2. The stock quotation system of claim 1 wherein said quotation terminal signalling means includes a plurality of touch keys.

3. The stock quotation system of claim 2 wherein said quotation information is obtained by touching different combinations of said keys, each combination corresponding to a numerical code representative of a stock, the digits of said numerical code generated by touching said keys being sequentially displayed on said display means as each of said keys is touched so that the user of said quotation terminal is advised that the code has been correctly generated and received by said data processing system.

4. The stock quotation system of claim 2 wherein said signalling means for generating address and control signals includes signal generating means for generating a pair of frequencies for each different key and said terminal further including receiving means for receiving frequency shift key signals representative of information received from said data processing system and conversion means for converting said frequency shift key signals to a code to enable a visual display.

5. The stock quotation system of claim 4 wherein said data processing system includes receiving means connected to said telephone lines, said receiving means including a first plurality of filters for passing each of the frequencies utilized by said signal generator, said receiving means further including a second plurality of filters, each of which is similar to one of said filters of said first group, a plurality of detector means each connected to the output of one of said second plurality of filters for detecting a predetermined level of transmission of signals at said different frequencies, gating means connected to said detectors to inhibit passage of signals by each of said filters of said first plurality of filters which are adapted to pass signals other than the frequency detected.

6. The stock quotation system of claim 1 wherein said data processing system includes a plurality of interface modules for entering data and withdrawing data from said data processing system, each of said modules including buffer storages for temporarily storing characters until the particular module is accessed by said computer so that maximum efficiency is made of said data processing system.

7. The stock market quotation system of claim 1 wherein said coupling means includes an acoustic coupler.

8. The stock quotation system of claim 1 wherein said system includes means for automatically connecting one of said terminals to said data processing system when the telephone associated therewith is used to dial the number of said data processing system, and disconnecting means in said system for disconnecting said data processing system from said telephone if said telephone is not used for requesting information for a predetermined period of time.

* * * * *